July 3, 1962 E. T. DUBATS 3,041,908
CUTTING APPARATUS FOR SHEET MATERIAL
Filed Aug. 13, 1957 2 Sheets-Sheet 1

INVENTOR
E. T. DUBATS
BY R. P. Miller
ATTORNEY

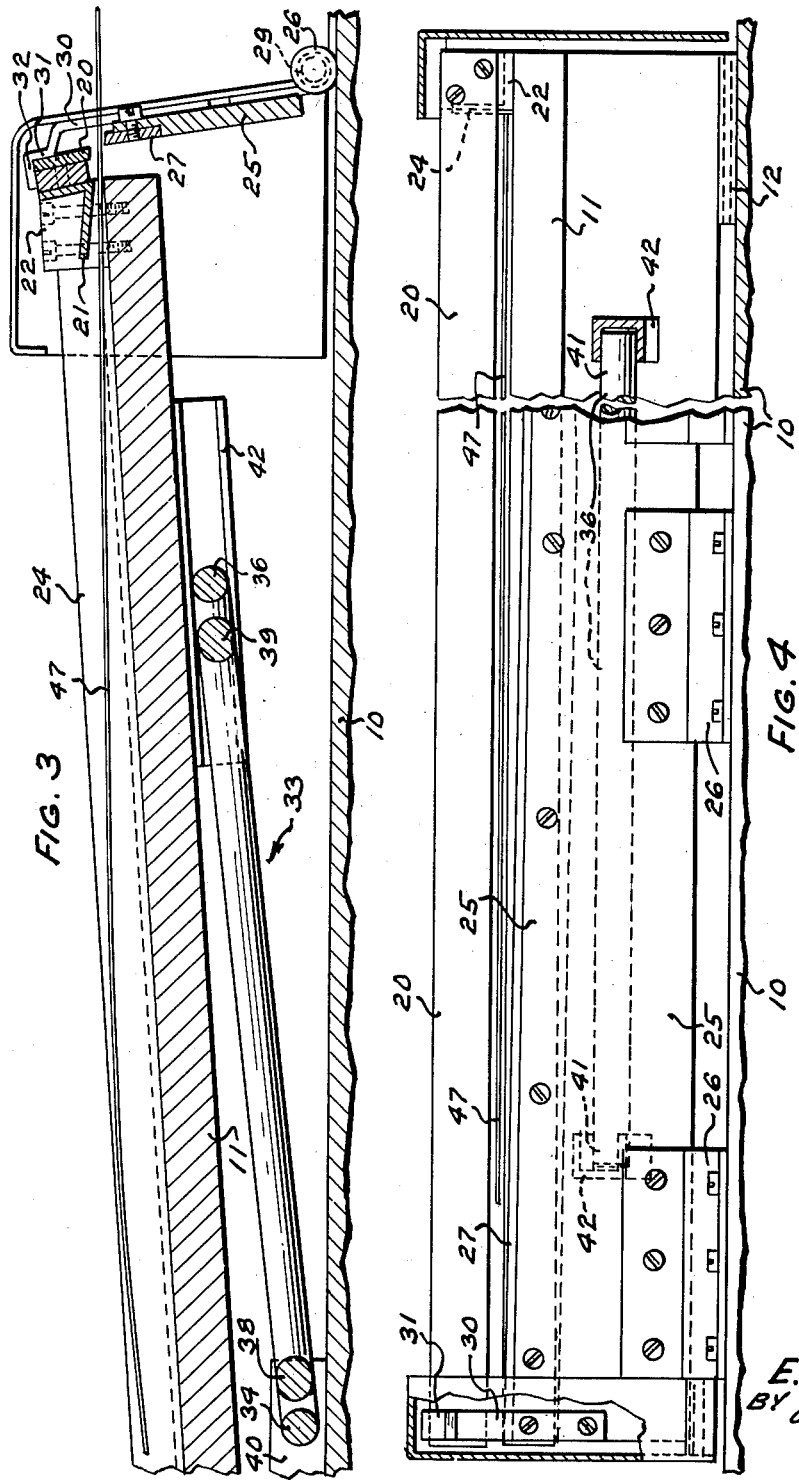

United States Patent Office 3,041,908
Patented July 3, 1962

3,041,908
CUTTING APPARATUS FOR SHEET MATERIAL
Edward T. Dubats, Chicago, Ill., assignor to Western Electric Company, Incorporated, New York, N.Y., a corporation of New York
Filed Aug. 13, 1957, Ser. No. 677,889
2 Claims. (Cl. 83—568)

This invention relates to shearing devices, and more particularly to a manually operable device for cutting sheets of paper from a roll thereof.

When cutting a roll of paper, such as a series of blueprints, into a plurality of individual sheets, it has been customary in the past to utilize a cutting device comprising a pivotally mounted table carrying a first cutter blade that cooperates with a second cutter blade. The web of material to be cut is fed over the top of a table and beneath the blade attached thereto, and the table is then depressed to cause the pair of blades to cooperate and shear the paper. Whenever the webs to be sheared are of considerable width, it is necessary to use a wide table. It is necessary to apply the depressing force at a point close to the center of the blade-carrying edge of a wide table in order to preclude a twisting of the table structure which results whenever the depressing force is applied adjacent the corners of the free edge of the table. The twisting results in improper cooperation between the cutting blades and a resultant irregular cutting or tearing of the paper rather than a smooth shearing thereof. When cutting wide webs of paper, it is not always convenient for the operator to apply the depressing force centrally of the free edge of the table.

It is, therefore, a primary object of the present invention to provide a new economical table cutter having facilities therein to insure the even distribution of cutting forces.

It is another object of this invention to provide a pivoted table-type shearing apparatus which includes a stabilizing device that will maintain a pivoted blade parallel to the base of the apparatus regardless of the point of application of the depressing force.

It is still another object of this invention to provide a pivoted table-type cutting apparatus including a stabilizing device which precludes twisting of the table whenever the depressing force is applied adjacent the edges of the table.

With these and other objects in view, the present invention contemplates a table, for receiving a web of sheet material to be cut, pivoted at one extremity to a base member and carrying a first cutting blade fixed to the opposite extremity thereof. A second cutting blade is pivoted on the base member and urged into cooperable relationship with said first blade. A stabilizing device is mounted pivotally on the base member beneath the table and at a point intermediate the extremities thereof. The opposite extremity of the stabilizing device is connected slidably to the underside of the table at a point intermediate the extremities thereof, and serves to support the table and preclude twisting thereof whenever the table is depressed to effect a cutting operation.

Other objects, advantages and novel features of the invention will become apparent upon consideration of the following detailed description in conjunction with the accompanying drawings, wherein.

Figure 1:
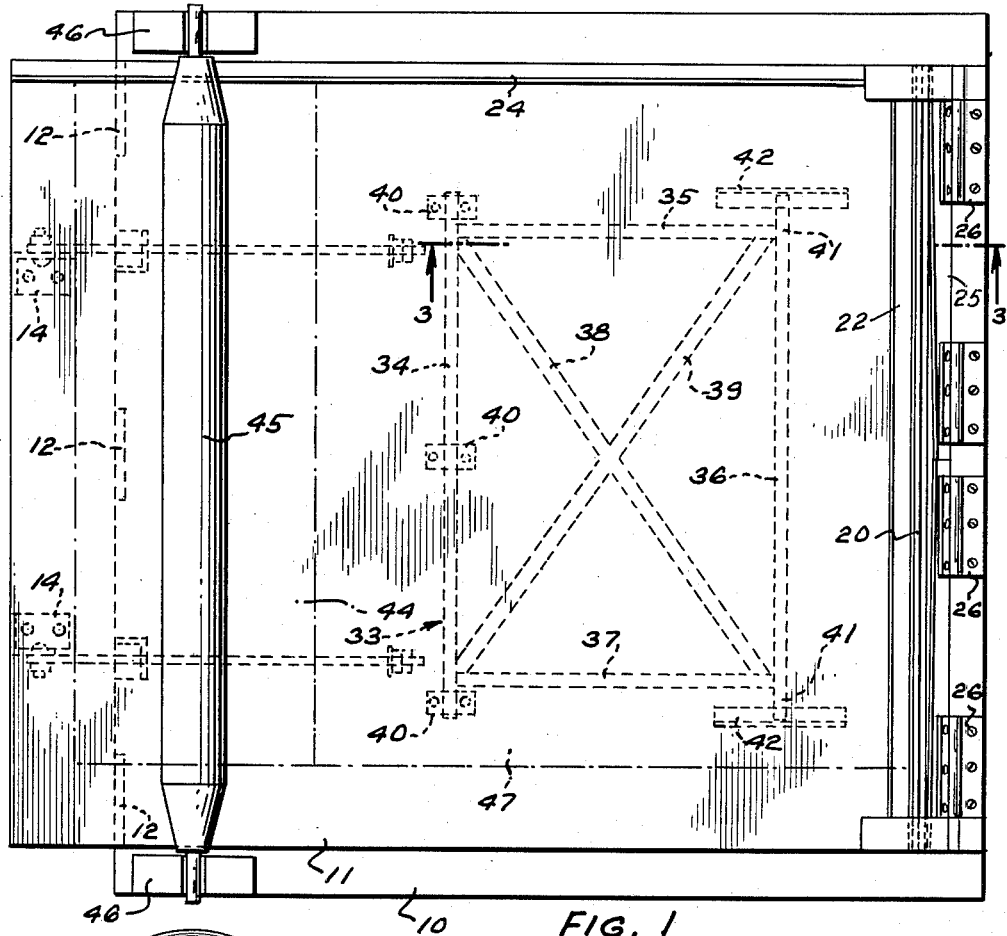
FIG. 1 is a top plan view of a cutting apparatus embodying the principal features of the invention.

FIG. 3 is an enlarged sectional view taken along line 3—3 of FIG. 1, and illustrates the manner in which the stabilizing device interconnects the base and the table and also the details of construction and mounting of the cutting blades, and FIG. 4 is an enlarged, fragmentary end elevation view, partially in section, of the apparatus shown in FIG. 1, and illustrates the mounting arrangement utilized for the lower cutting blade.

Figure 2:
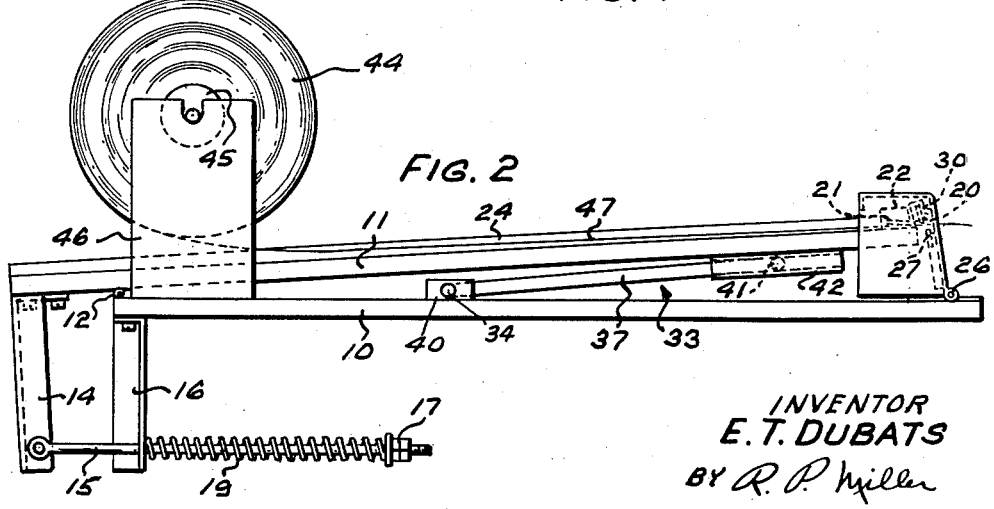
FIG. 2 is a side elevation view of the apparatus shown in FIG. 1 and illustrates the roll mounting means and the resilient means utilized to urge the table upwardly and out of cooperative relationship with the lower cutting blade.

Attention is now directed to the drawings wherein like numerals of reference designate like parts throughout the several views, and particularly to FIGS. 1 and 2 wherein is disclosed a base 10 upon which a table 11 is mounted pivotally by means of hinges 12. A pair of members 14 are mounted on the rearward extremity of the table 11 in a depending fashion and have spring rods 15 secured pivotally to the free extremities thereof. The spring rods 15 are positioned slidably within apertures in supporting brackets 16 and are provided with retaining nuts 17 on the free extremities thereof. Compression springs 19 are mounted on the rods 15 and interposed between the supporting brackets 16 and the retaining nuts 17 to normally urge the rods 15 to the right, as viewed in FIGS. 1 and 2. The force resulting from the compression of the springs 19 tends to cause the table 11 to rotate in a counterclockwise direction about the axis of the hinges 12. An upper cutting blade 20 (FIG. 3) and a paper guide 21 are mounted on the opposite extremity of the table 11 by means of mounting blocks 22. The table 11 is further provided with an angular guide 24 fastened along one side thereof and at right angles to the cutting blade 20.

Referring to FIG. 3, there is shown a blade supporting member 25 that is mounted pivotally on the base 10 by means of hinges 26. The member 25 mounts a lower cutting blade 27 in a recessed portion thereof. The hinges 26 are provided with internal torsion springs 29 which normally urge the member 25 to rotate in a counterclockwise direction as viewed in FIGS. 2 and 3. A stop member 30 is secured to the member 25 and is provided with a substantially vertical section 31 which is adapted to engage the upper cutting blade 20 and limit the movement of the member 25 under the influence of the torsion spring 29. The stop member 30 is further provided with a substantially horizontally disposed portion 32 which is adapted to engage the top surface of the upper cutting blade 20 to limit the pivotal movement of the table 11 under the influence of the compression springs 19.

The stabilizing device, designated generally by the reference numeral 33, is formed of rods 34, 35, 36 and 37 (FIG. 1) secured together in the form of a rectangle, and a pair of rods 38 and 39 secured within the rectangle and forming the diagonals thereof. The stabilizing device is mounted pivotally on the base 10 by means of hinge blocks 40 which are located along the rod 34. The rod 36 is provided with extremities 41 which project beyond the rods 35 and 37. These projections 41 are slidable within channel members 42 which are secured to the underside of the table 11.

Operation

In the operation of the apparatus, a roll of material 44 to be cut is mounted upon an arbor 45 and the extremities of the arbor are positioned within notches formed in the tops of bearing blocks 46. The free end of the web 47 is then unrolled and fed between the paper guide 21 and the top of the table 11. The roll of material 44 is then moved along the arbor 45 to bring one edge of the web 47 into abutting relationship with the angular guide 24 in order to insure that the cuts to be made will be perpendicular to the longitudinal axis of the web.

The web 47 is then pulled to the right, as viewed in FIGS. 2 and 3, until the line along which the first cut is to be made is directly beneath the cutting edge of the upper blade 20. The operator then presses on the top of the table 11 to depress the free extremity thereof and thus shear the web 47 between the blades 20 and 27. The torsion springs 29 maintain the lower blade 27 in co-operative relationship with the upper blade 20 when the upper blade has been depressed sufficiently to clear the vertical section 31 of the stop member 30.

As the table 11 is descending during the cutting operation, the projections 41 on the rod 36 slide within the channel members 42 and thus provide support for the table 11. Because of the rigidity of the structure utilized for the stabilizing device, and due to the fact that the stabilizer pivots about an axis other than the pivotal axis of the table 11, the table is precluded from twisting even when the depressing force is applied to the very corners of the free extremity thereof. The cutting blades 20 and 27 are consequently in shearing contact during the entire shearing operation and are thus enabled to function in the manner for which they were designed, since the stabilizer maintains the blade 20 parallel to the base 10 at all times independently of the point of application of the depressing force.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. An apparatus for cutting sheet material comprising a base, a depressible table hinged at one end to said base, a first cutting blade mounted rigidly on the opposite end of said table in spaced relation thereto and substantially parallel to the base, means for guiding sheet material between the top of said table and said first blade, a second blade mounted pivotally on said base and resiliently urged into cutting relationship with said first blade, resilient means normally urging the table upwardly to hold the blades out of cutting engagement, and a rigid stabilizer frame pivoted on said base along an axis parallel to and intermediate said ends of the table and connected slidably to the underside of said table along the opposite sides and adjacent said opposite end of the table, said stabilizer frame being responsive to a depressing force applied to the table to preclude twisting of the table and maintain said first blade substantially parallel to said base as the table is depressed.

2. An apparatus for cutting sheet material comprising a base, a depressible table hinged at one end to the base, a first cutting blade mounted rigidly on the opposite end of the table in spaced relation thereto and substantially parallel to the base, means for guiding sheet material between the top of the table and the first blade, a second blade mounted pivotally on the base and urged resiliently into cutting relationship with the first blade, resilient means normally urging the table upwardly to hold the blades out of cutting engagement, a rigid stabilizer frame interconnecting the base and the table, one end of the stabilizer frame being mounted pivotally on the base about an axis parallel to the axis of pivoting of the table and intermediate said ends of the table, the opposite end of the stabilizer frame being provided with a pair of slide projections, and guide means secured to the underside of the table along the opposite sides and adjacent said opposite end of the table, the guide means being for guiding the slide projections along said opposite sides to allow pivoting of the table as the table is depressed, so that the stabilizer frame provides support for the opposite sides of the table along said opposite end of the table to preclude twisting of the table to maintain the first blade substantially parallel to the base.

References Cited in the file of this patent

UNITED STATES PATENTS

| 711,518 | Murphy | Oct. 21, 1902 |
| 1,433,799 | Caywood | Oct. 31, 1922 |
| 2,351,093 | Beckley | June 13, 1944 |

FOREIGN PATENTS

| 2,922 | Great Britain | Feb. 9, 1899 |
| 14,760 | Great Britain | June 26, 1907 |
| 8,707 | Great Britain | Nov. 18, 1915 |
| 134,744 | Great Britain | Nov. 13, 1919 |
| 340,591 | Germany | Sept. 15, 1921 |